United States Patent
Li et al.

(10) Patent No.: US 11,050,520 B2
(45) Date of Patent: Jun. 29, 2021

(54) SOFT BUFFER PROCESSING METHOD AND DEVICE IN TDD SYSTEMS

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd

( * ) Notice: Subject to any disclaimer, the term of this patent is extended or adjusted under 35 U.S.C. 154(b) by 254 days.

(21) Appl. No.: 14/377,788

(22) PCT Filed: Mar. 20, 2013

(86) PCT No.: PCT/KR2013/002284
§ 371 (c)(1),
(2) Date: Aug. 8, 2014

(87) PCT Pub. No.: WO2013/154276
PCT Pub. Date: Oct. 17, 2013

(65) Prior Publication Data
US 2016/0056926 A1   Feb. 25, 2016

(30) Foreign Application Priority Data

Apr. 12, 2012  (CN) .......................... 201210107431.9
Aug. 2, 2012   (CN) .......................... 201210273508.X (51) Int. Cl.
*H04L 1/18*     (2006.01)
*H04L 5/14*     (2006.01)
(Continued)

(52) U.S. Cl.
CPC .......... *H04L 1/1874* (2013.01); *H04L 1/0067* (2013.01); *H04L 1/1822* (2013.01);
(Continued)

(58) Field of Classification Search
None
See application file for complete search history.

(56) References Cited

U.S. PATENT DOCUMENTS 8,286,047 B2 * 10/2012 Che ........................ H04L 1/1845
714/751
8,472,991 B2    6/2013 Pelletier et al.
(Continued)

FOREIGN PATENT DOCUMENTS

CN     101888661     11/2010
CN     101965707      2/2011
(Continued)

OTHER PUBLICATIONS

European Search Report dated Dec. 15, 2015 issued in counterpart application No. 13776119.3-1851, 8 pages.
(Continued)

*Primary Examiner* — Gregory B Sefcheck
*Assistant Examiner* — Suk Jin Kang
(74) *Attorney, Agent, or Firm* — The Farrell Law Firm, P.C.

(57) ABSTRACT

Methods, device, and User Equipment (UE) for processing a soft buffer, used in a Time Division Duplexing (TDD) system where uplink-downlink subframe distribution changes dynamically, are provided. A first method includes allocating, by a base station, transmission resources for a UE, and determining a parameter for processing a soft buffer, and performing rate matching for Physical Downlink Shared Channel (PDSCH); and sending, by the base station, data to the UE via Physical Downlink Control Channel (PDCCH) and PDSCH. The second method includes receiving, by a UE information of transmission resources allocated to the UE by a base station, and determining a parameter for processing a soft buffer; and receiving, by the UE, PDCCH and PDSCH sent by the base station according to the (Continued)

transmission resources and the parameter for processing the soft buffer.

2 Claims, 4 Drawing Sheets

(51) Int. Cl.
    *H04W 72/04*     (2009.01)
    *H04L 1/00*     (2006.01)
    *H04L 5/00*     (2006.01)

(52) U.S. Cl.
    CPC .......... *H04L 1/1896* (2013.01); *H04L 5/0044* (2013.01); *H04L 5/14* (2013.01); *H04W 72/04* (2013.01)

(56) References Cited

U.S. PATENT DOCUMENTS

| | | | | |
|---|---|---|---|---|
| 8,724,742 | B2* | 5/2014 | Nimbalker | H04L 1/1822 375/260 |
| 9,838,162 | B2* | 12/2017 | Seo | H04L 1/1812 |
| 2005/0250454 | A1 | 11/2005 | Sebire et al. | |
| 2008/0320353 | A1* | 12/2008 | Blankenship | H04L 1/0068 714/746 |
| 2009/0040976 | A1* | 2/2009 | Kim | H04L 1/1822 370/329 |
| 2010/0050034 | A1* | 2/2010 | Che | H04L 1/1845 714/748 |
| 2012/0057529 | A1* | 3/2012 | Seo | H04L 1/1835 370/328 |
| 2012/0275397 | A1* | 11/2012 | Hsieh | H04L 1/1812 370/329 |
| 2013/0051289 | A1* | 2/2013 | Hsieh | H04L 1/1845 370/280 |
| 2013/0070652 | A1* | 3/2013 | Li | H04L 1/1822 370/280 |
| 2013/0083736 | A1* | 4/2013 | Yin | H04W 72/0446 370/329 |
| 2013/0083753 | A1* | 4/2013 | Lee | H04W 72/0453 370/329 |
| 2013/0121216 | A1* | 5/2013 | Chen | H04L 1/1835 370/280 |
| 2013/0165183 | A1* | 6/2013 | Gerstenberger | H04L 1/1835 455/561 |
| 2013/0176981 | A1* | 7/2013 | Earnshaw | H04L 1/02 370/329 |
| 2013/0188516 | A1* | 7/2013 | He | H04W 28/16 370/254 |
| 2013/0188533 | A1* | 7/2013 | He | H04J 3/1605 370/280 |
| 2013/0194980 | A1* | 8/2013 | Yin | H04L 1/1607 370/280 |
| 2013/0201815 | A1 | 8/2013 | Lin et al. | |
| 2013/0242729 | A1* | 9/2013 | Chen | H04W 28/0289 370/230 |
| 2013/0265948 | A1* | 10/2013 | Lee | H04L 1/1861 370/329 |
| 2013/0265949 | A1* | 10/2013 | Lee | H04L 1/1812 370/329 |
| 2014/0010128 | A1* | 1/2014 | He | H04B 7/0456 370/280 |
| 2014/0010213 | A1* | 1/2014 | Wang | H04B 7/0486 370/336 |
| 2014/0044066 | A1* | 2/2014 | Hsieh | H04W 72/1278 370/329 |
| 2014/0044206 | A1* | 2/2014 | Nammi | H04B 7/0417 375/267 |
| 2014/0133471 | A1* | 5/2014 | Nammi | H04L 1/0025 370/336 |
| 2014/0198758 | A1* | 7/2014 | Nimbalker | H04L 1/1822 370/329 |
| 2014/0293883 | A1* | 10/2014 | Wang | H04L 5/1469 370/329 |
| 2015/0009872 | A1* | 1/2015 | Yang | H04J 3/00 370/280 |
| 2015/0016315 | A1* | 1/2015 | Yang | H04J 3/00 370/280 |
| 2015/0071193 | A1* | 3/2015 | Seo | H04L 1/1692 370/329 |
| 2015/0180616 | A1* | 6/2015 | Lee | H04L 1/1812 370/329 |
| 2015/0264686 | A1* | 9/2015 | Kim | H04L 1/1822 370/329 |
| 2015/0333891 | A1* | 11/2015 | Cheng | H04L 1/1835 370/329 |
| 2015/0358122 | A1* | 12/2015 | Yang | H04L 1/1822 370/280 |
| 2015/0358978 | A1* | 12/2015 | Lin | H04L 5/0053 370/280 |
| 2016/0164622 | A1* | 6/2016 | Yi | H04B 7/2656 370/280 |
| 2016/0218996 | A1* | 7/2016 | Gerstenberger | H04L 1/1835 |
| 2016/0337090 | A1* | 11/2016 | Gauvreau | H04W 16/24 |
| 2017/0048836 | A1* | 2/2017 | Yang | H04J 3/00 |
| 2017/0223671 | A1* | 8/2017 | He | H04W 28/16 |
| 2017/0238300 | A1* | 8/2017 | Gerstenberger | H04W 72/0406 370/329 |
| 2017/0310454 | A1* | 10/2017 | He | H04W 52/0206 |
| 2018/0167190 | A1* | 6/2018 | He | H04L 5/0055 |
| 2018/0241512 | A1* | 8/2018 | Seo | H04L 1/1864 |

FOREIGN PATENT DOCUMENTS

| | | |
|---|---|---|
| CN | 101978745 | 2/2011 |
| CN | 102076023 | 5/2011 |
| EP | 2 023 523 | 2/2009 |
| EP | 2 395 692 | 12/2011 |
| KR | 1020100126455 | 12/2010 |
| RU | 2 394 380 | 7/2010 |
| RU | 2 435 316 | 11/2011 |
| WO | WO 2009/118595 | 10/2009 |
| WO | WO 2010/054535 | 5/2010 |

OTHER PUBLICATIONS

PCT/ISA/237 Written Opinion issued on PCT/KR2013/002284 (pp. 6).
PCT/ISA/210 Search Report issued on PCT/KR2013/002284 (pp. 3).
Samsung, "PDSCH HARQ Timing", R1-121612, 3GPP TSG RAN WG1 #68bis, Mar. 26-30, 2012.
NTT Docomo, "UE Behaviour for PDSCH Reception with Limited Soft Buffer in CA", Change Request, R1-112012, 3GPP TSG-RAN Meeting #65, May 9-13, 2011.
CATT, CMCC, "Optimization of Soft Buffer Allocation for TDD", R1-094120, 3GPP TSG RAN WG1 Meeting #58bis, Oct. 12-16, 2009.
CATT, "Soft Buffer Allocation for TDD and TP for 36.212", R1-082568, 3GPP TSG RAN WG1 Meeting #53bis, Jun. 30-Jul. 4, 2008.
3rd Generation Partnership Project; Technical Specification Group Radio Access Network; Evolved universal Terrestrial Radio Access (E-UTRA).
Physical Layer Procedures (Release 10), 3GPP TS 36.213 V10.5.0, Mar. 2012.
Ericsson, ST-Ericsson, "Specification Impact of TDD Traffic Adaptation", R1-121709, 3GPP TSG RAN WG1 #68bis, Mar. 26-30, 2012, 3 pages.
Alcatel-Lucent Shanghai Bell et al., "Discussion on HARQ and UL-Grant Timing with Dynamic TDD UL-DL Configuration", R1-121260, 3GPP TSG RAN WG1 #68bis, Mar. 26-30, 2012, 6pps.
LG Electronics, "Support of Half-Duplex Operation based TDD CA with Different UL-DL Configurations", R1-121420, 3GPP TSG RAN WG1 #68bis, Mar. 26-30, 2012, 7 pages.

(56) References Cited

OTHER PUBLICATIONS

Japanese Office Action dated Feb. 20, 2017 issued in counterpart application No. 2015-505630, 8 pages.
Russian Office Action dated Dec. 9, 2016 issued in counterpart application No. 2014145324/08, 9 pages.
Japanese Office Action dated Nov. 13, 2017 issued in counterpart application No. 2015-505630, 8 pages.
Korean Office Action dated Sep. 25, 2019 issued in counterpart application No. 10-2014-7020137, 7 pages.
Chinese Office Action dated Jul. 27, 2017 issued in counterpart application No. 201210273508.X, 16 pages.
Chinese Office Action dated May 9, 2018 issued in counterpart application No. 201210273508.X, 10 pages.

* cited by examiner

SOFT BUFFER PROCESSING METHOD AND DEVICE IN TDD SYSTEMS

PRIORITY

This application is a National Phase Entry of PCT International Application No. PCT/KR2013/002284, which was filed Mar. 20, 2013, and claims priority to Chinese Patent Application Nos. 201210107431.9 and 201210273508.X, which were filed on Apr. 12, 2012 and Aug. 2, 2012, respectively, in the Chinese Intellectual Property Office, the contents of which are incorporated herein by reference.

BACKGROUND

1. Field of the Invention

The present invention relates generally to the field of mobile communications, and more particularly, to a soft buffer processing method and device in TDD systems.

2. Description of the Related Art

Figure 1:
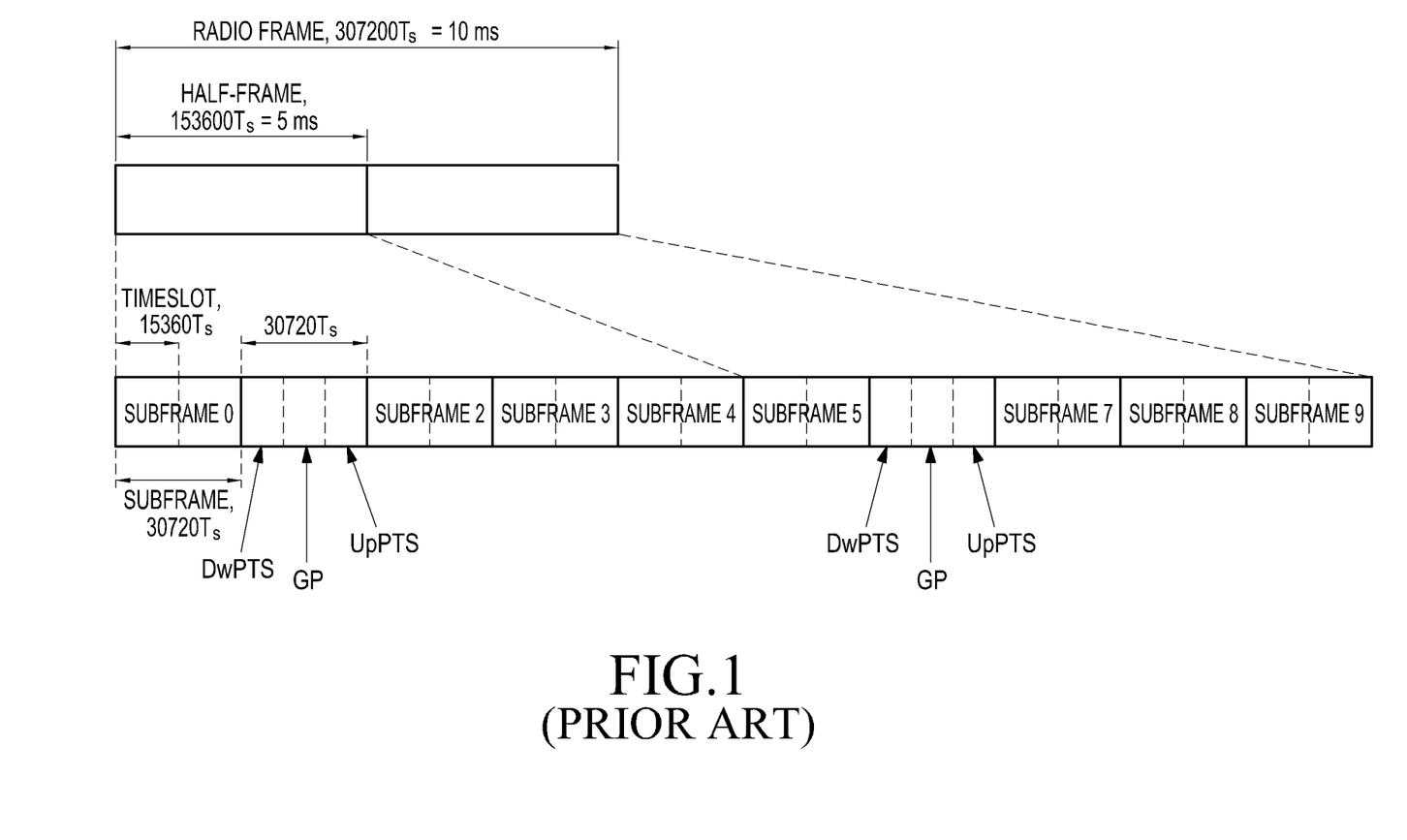
FIG. 1 is a schematic diagram of a TDD system frame structure.

A Long Term Evolution (LTE) system supports Time Division Duplexing (TDD). A frame structure of a TDD system is shown in FIG. 1. The length of each radio frame is 10 ms, and each radio frame is equally split into two half-frames with 5 ms length. Each half-frame contains 8 timeslots of 0.5 ms length and 3 special fields, i.e. Downlink Pilot Time Slot (DwPTS), Guard Period (GP), and Uplink Pilot Time Slot (UpPTS), the total length of these 3 special fields being 1 ms. Each subframe consists of two consecutive timeslots, i.e. kth subframe containing timeslots 2k and 2k+1. A TDD system supports 7 uplink-downlink configurations, as shown in Table 1. Here, D represents a downlink subframe, U represents an uplink subframe, and S represents the special subframe containing the 3 special fields.

TABLE 1

LTE TDD Uplink-Downlink Configurations

| Configuration Number | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

LTE TDD Uplink-Downlink Configurations

In the LTE TDD system, for downlink data Hybrid Automatic Repeat reQuest (HARQ) transmission, a Physical Downlink Control Channel (PDCCH) is configured to schedule a Physical Downlink Shared Channel (PDSCH) in a current subframe; and Acknowledged/Not Acknowledged (ACK/NACK) information corresponding to the PDSCH or the PDCCH indicating downlink Semi-Persistent Scheduling release (SPS release) in 0, 1, or more downlink subframes can be fed back in one uplink subframe n, the indexes of these downlink subframes being n-k, where k belongs to a set K and the set K is decided by the uplink-downlink configuration and the uplink subframe n. Table 2 discloses HARQ timing relations defined in the LTE release 8 system.

TABLE 2

Index Set K

| Uplink-downlink configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

According to the above HARQ timing relations, the maximum numbers of downlink HARQ processes corresponding to the above 7 TDD uplink-downlink configurations are different. Here, for each TDD uplink-downlink configuration, the maximum number of downlink HARQ processes is used to guarantee the base station identifying respective parallel HARQ processes without confusion by using the HARQ process indexes in the PDCCH.

TABLE 3

| Uplink-downlink configuration | Maximum number of downlink HARQ processes |
|---|---|
| 0 | 4 |
| 1 | 7 |
| 2 | 10 |
| 3 | 9 |
| 4 | 12 |
| 5 | 15 |
| 6 | 6 |

HARQ timing relations of the LTE TDD system are described above, and another question related to HARQ is how to process a soft buffer. In fact, User Equipments (UEs) are divided into multiple UE categories according to their processing capacity, and the division is based on whether a UE supports Multiple-Input Multiple-Output (MIMO), the maximum number of MIMO data streams supported, the size of the soft buffer, etc. Here, the soft buffer is used to save received soft bits when the UE is unable to decode data sent from the base station properly, and can perform soft combination during HARQ retransmission, thus improving the link performance.

The process of the soft buffer influences Rate Matching (RM) of downlink data at the base station side. In the LTE TDD release 10, the size of a soft buffer of a UE is denoted $N_{soft}$, and no matter if the UE is in the single carrier mode or in the carrier aggregation mode, for each code block of a transport block, rate matching is performed according to the size of the soft buffer $$N_{cb} = \min\left(\left\lfloor \frac{N_{IR}}{C} \right\rfloor, K_w\right),$$

where C is the total number of code blocks divided from the transport block, $K_w$ is the total number of encoding bits output by turbo encoding, $$N_{IR} = \left\lfloor \frac{N_{soft}}{K_C \cdot K_{MIMO} \cdot \min(M_{DL\_HARQ}, M_{limit})} \right\rfloor,$$

$K_{MIMO}$ depends on the transmission mode of the UE, for MIMO transmission mode, $K_{MIMO}=2$, for non-MIMO transmission mode, $K_{MIMO}=1$, $M_{DL\_HARQ}$ is the maximum number of downlink HARQ processes given in Table 3, $M_{limit}$ is a constant equal to 8, and $K_C$ is a constant related to the UE capacity category. That is to say, no matter how many carriers the UE actually works at, when the rate matching is performed, the same method as the UE only configuring the current one carrier is used to perform the rate matching.

At the UE side, when the UE incorrectly decodes a code block, it must keep soft bits for the code block, so that HARQ soft combination can be performed, thus improving the link performance. To better support HARQ Incremental Redundancy (IR), the base station must know which soft bits have been actually stored when the UE is unable to decode the code block correctly. In the LTE TDD Release 10, the method of UE processing a soft buffer is allocating its soft buffer equally to one or more cells currently being configured. The number of carriers configured by the UE is denoted $N_{cells}^{DL}$, and for each cell, for at least $K_{MIMO} \cdot \min(M_{DL\_HARQ}, M_{limit})$ transport blocks, when the decoding of a code block of a transport block has failed, soft bits $w_k, w_{k+1}, \ldots, w_{mod(k+n_{SB}-1,N_{cb})}$ must be kept by the UE for this code block as specified in LTE Advanced (LTE-A), where $$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right),$$

$w_k$ is a soft bit received by the UE, and k is the relative smaller index of indexes of respective soft bits received by the UE.

In the current LTE system specification, the uplink-downlink configuration adopted by a cell is configured via broadcast signaling, i.e., contained in the System Information Block 1 (SIB1). Therefore, the LTE system supports changing the uplink-downlink configuration once every 640 nm at the fastest, and changing the system information 32 times in 3 hours at most in the current specification. To quickly adapt to changes of service characteristics, currently the 3rd Generation Partnership Project (3GGP) organization is studying how to support changing the system uplink-downlink subframe allocation at a faster speed. For example, support changing the uplink-downlink configuration at a faster speed, e.g. changing once every 200 ms; or changing the uplink-downlink subframe configuration at an order of time with radio frame length being 10 ms. In fact, the base station scheduler changes the uplink-downlink subframe distribution according to service requirements, and adopts certain scheduling restrictions to sustain system normal working, while the UE may not need to know which of the 7 uplink-downlink configurations it is working at. Even the actual working uplink-downlink subframe distribution can be unlimited to the above seven configurations in Table 1, and above all, the actual uplink-downlink subframe distribution can be transparent to the UE. The change of the uplink-downlink subframe distribution adopted by this kind of cell influences HARQ-ACK timing relation during downlink transmission, resulting in the change of the maximum number of downlink HARQ processes, and accordingly influences processing of soft buffer of data during the HARQ transmission.

SUMMARY

The present invention has been made to address the above-mentioned problems and disadvantages, and to provide at least the advantages described below. Accordingly, an aspect of the present invention provides a method of and device for processing a soft buffer when changing allocation for an uplink-downlink subframe of a TDD system.

In accordance with an aspect of the present invention, a method of processing soft buffer, used in a Time Division Duplexing (TDD) system where uplink-downlink subframe distribution changes dynamically, is provided. The method includes allocating, by a base station, transmission resources for a User Equipment (UE), and determining a parameter for processing a soft buffer, and performing rate matching for Physical Downlink Shared Channel (PDSCH); and sending, by the base station, data to the UE via Physical Downlink Control Channel (PDCCH) and PDSCH.

In accordance with another aspect of the present invention, a method of processing soft buffer, used in a Time Division Duplexing (TDD) system where uplink-downlink subframe distribution changes dynamically, is provided. The method includes receiving, by a User Equipment (UE), information of transmission resources allocated to the UE by a base station, and determining a parameter for processing a soft buffer; and receiving, by the UE, Physical Downlink Control Channel (PDCCH) and Physical Downlink Shared Channel (PDSCH) sent by the base station according to the transmission resources and the parameter for processing the soft buffer.

In accordance with another aspect of the present invention a base station side device, used in a Time Division Duplexing (TDD) system where uplink-downlink subframe distribution changes dynamically, is provided. The base station side device includes a resource management module configured to allocate transmission resources for a User Equipment (UE) and determine a parameter for processing a soft buffer; and a sending module configured to perform rate matching for Physical Downlink Shared Channel (PDSCH) and send data to the UE via Physical Downlink Control Channel (PDCCH) and PDSCH.

In accordance with another aspect of the present invention a User Equipment (UE), used in a Time Division Duplexing (TDD) system where uplink-downlink subframe distribution changes dynamically, is provided. The UE includes a resource management module configured to determine information of transmission resources allocated to it by a base station, and determine a parameter for processing a soft buffer; and a receiving module configured to receive Physical Downlink Control Channel (PDCCH) and Physical Downlink Shared Channel (PDSCH) sent by the base station according to the transmission resources and the parameter for processing the soft buffer. In accordance with another aspect of the present invention a method of supporting downlink transmission, used in a Time Division Duplexing (TDD) system where uplink-downlink subframe distribution changes dynamically, is provided. The method includes receiving, by a User Equipment (UE), information sent by a base station via Physical Downlink Shared Channel (PDCCH) and Physical Downlink Shared Channel (PDSCH) based on transmission resources allocated by a base station; and feeding back, by a UE, Hard-Acknowledgement (HARQ-ACK) information to the base station according to a reference HARQ-ACK timing relation, wherein a reference HARQ-ACK timing relation defines a HARQ-ACK feedback timing of subframes applicable to downlink transmission during downlink transmission.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

To make the objects and technical solutions of the present invention clear and understandable, further detailed description is provided for the present invention by reference to the drawings and embodiments of the present invention.

According to the above present invention, for a TDD system where the uplink-downlink subframe distribution can be changed quickly or dynamically, according to different instruction methods adopted, the UE may know which configuration it is currently working at, the UE may not know actual allocation for the current uplink-downlink subframe, or the actual distribution for the working uplink-downlink subframe can be different from the existed uplink-downlink configurations. The base station scheduler guarantees normal proceeding of uplink-downlink data transmission. The change of the uplink-downlink subframe distribution of a cell influences the HARQ-ACK timing relation of downlink transmission, resulting in the change of the actual maximum number of downlink HARQ processes, and accordingly influences processing of soft buffer of data during the HARQ transmission by a base station and a UE.

In the following description, a UE supporting the function of flexible configuration for uplink-downlink subframe is called a new UE, and correspondingly, a UE that does not support the function of flexible configuration for uplink-downlink subframe is called an old UE. For an old UE, uplink-downlink data is transmitted according to the basic TDD uplink-downlink configuration configured by the SIB1 broadcast information.

One possible method of defining a HARQ-ACK timing relation of downlink transmission is defining the HARQ-ACK timing relation by complying with a reference HARQ-ACK timing relation, independent of actual distribution for currently running uplink-downlink subframe and the basic TDD uplink-downlink configuration configured by the SIB1 broadcast information. For a new UE, for the subframes whose HARQ-ACK timing has been defined in the reference HARQ-ACK timing relation, the HARQ-ACK feedback timing of such subframes will be determined according to this reference HARQ-ACK timing relation. For example, the HARQ-ACK feedback timing corresponding to all subframes that can be possible to be fixed as downlink subframes or subframes that can be flexibly changed into downlink subframes during the actual running is defined in the reference HARQ-ACK timing relation, so that the downlink transmission of the new UE is performed according to HARQ-ACK feedback timing positions got from the reference HARQ-ACK timing relation. Specifically, the set of subframes of the cell that may work at downlink direction during actual running is denoted $K_{working}$, the set of downlink subframes with HARQ-ACK feedback timing being defined in the reference timing relation is denoted $K_{ref}$, then the selection of a reference timing relation guarantees $K_{working}$ being a subset of $K_{ref}$. It is worthy of noting that $K_{working}$ can be the same as $K_{ref}$; i.e., the biggest subset of $K_{ref}$ is itself. To simplify the system operation, a possible method of defining a reference HARQ-ACK timing relation is reusing a HARQ-ACK timing relation of an existing uplink-downlink configuration, e.g. one of the 7 configurations in Table 1, accordingly, and the reference HARQ-ACK timing relation can be got from Table 2.

Figure 2:
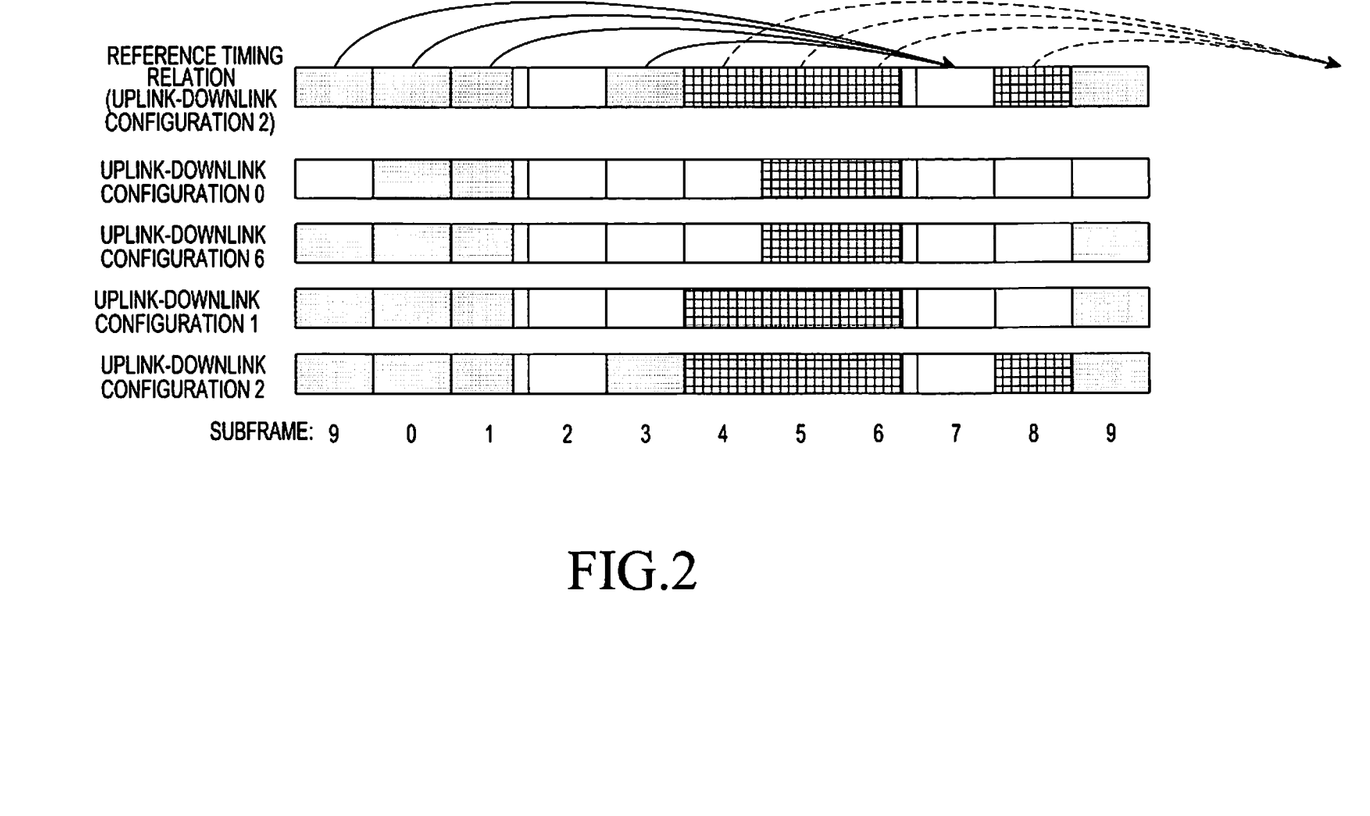
FIG. 2 is a schematic diagram of reference HARQ-ACK timing.

As shown in FIG. 2, HARQ-ACK timing in conventional TDD uplink-downlink configuration 2 is adopted as the above reference HARQ-ACK timing relation, i.e. the HARQ-ACK feedback timing of downlink transmission in subframes 9, 0, 1, and 3 is in subframe 7. Specifically, if the current working TDD uplink-downlink configuration is uplink-downlink configuration 0, then the UE detects downlink transmission in subframes 0 and 1 at most, and according to the reference HARQ-ACK timing relation, the HARQ-ACK information of these 2 subframes will all be fed back in subframe 7; if the current working TDD uplink-downlink configuration is uplink-downlink configuration 1, then the UE detects the downlink transmission in subframes 9, 0, and 1 at most, and according to the reference HARQ-ACK timing relation, the HARQ-ACK information of these 3 subframes will all be fed back in subframe 7; if the current working TDD uplink-downlink configuration is 6, then the UE detects the downlink transmission in subframes 9, 0, and 1 at most, and according to the reference HARQ-ACK timing relation, the HARQ-ACK information of these 3 subframes will all be fed back in the subframe 7; and if the current working TDD uplink-downlink configuration is 2, then the UE detects the downlink transmission in subframes 9, 0, 1, and 3 at most, and according to the reference HARQ-ACK timing relation, the HARQ-ACK information of these 4 subframes will all be fed back in the subframe 7.

Actually, when the base station flexibly configures the direction of subframes, the TDD uplink-downlink subframe distribution working at a certain period is not necessary to be limited to one of the traditional uplink-downlink configurations, however, according to the HARQ-ACK timing relation of the TDD uplink-downlink configuration 2, the HARQ-ACK information of the downlink transmission of subframes 9, 0, 1 and 3 is always fed back in subframe 7.

The above reference timing relation can be configured via high level signaling including a cell specific broadcast signal or a UE specific Radio Resource Control (RRC) signaling; or the above reference timing relation is predefined, for example, predefining it as the HARQ timing relation of the TDD uplink-downlink configuration 2 for the system supporting the changes of the uplink-downlink subframe distribution. Alternatively, for the above reference timing relation, the timing relation of a traditional TDD uplink-downlink configuration can be uniquely determined as the reference timing relation when the cell is working in a flexible subframe mode according to the TDD uplink-downlink configuration sent in the broadcast information block SIB1, e.g., the TDD uplink-downlink configuration used as reference timing can be defined in a table for each uplink-downlink configuration in the broadcast information block SIB1.

When a cell changes from one uplink-downlink configuration to another uplink-downlink configuration, the maximum number of downlink HARQ processes will change accordingly, and at a border of the change of the new and old uplink-downlink configurations, the actual maximum number of downlink HARQ processes may be different from the maximum numbers of downlink HARQ processes of the old and new uplink-downlink configurations. In addition, when the base station changes the uplink-downlink subframe distribution, a UE may not know the actual currently running uplink-downlink subframe distribution, but only depends on a base station scheduler to guarantee the uplink-downlink data transmission proceeding properly, which means that the UE has no way to actually know the maximum number of the current actual downlink HARQ processes. Since the base station and the UE processing the soft buffer depends on the maximum number of HARQ processes of the cell, so when the uplink-downlink subframe distribution of the cell changes, the base station and the UE operating the soft buffer will definitely be affected. The method of processing soft buffer described by the present invention hereafter can be used together with the above method of determining the HARQ-ACK feedback timing by defining the reference HARQ-ACK timing relation of the present invention, but is not limited to this method of determining the HARQ-ACK feedback timing of downlink transmission.

Figure 3:
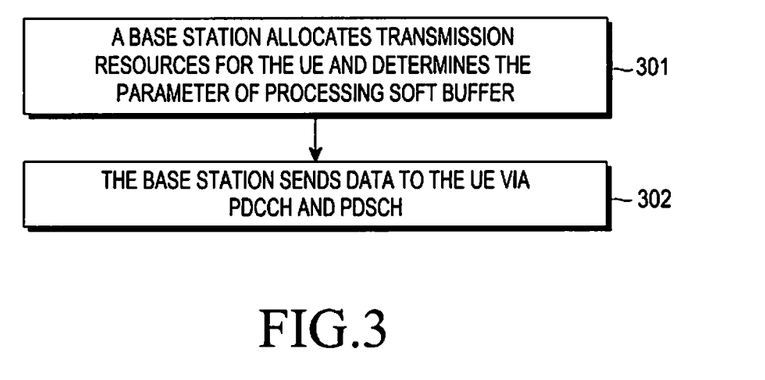
FIG. 3 is a flowchart of a method of base station side processing of a soft buffer according to an embodiment of the present invention.

FIG. 3 is a flow chart of a method of a base station processing a soft buffer according to the present invention, including the following steps.

In step 301, a terminal device allocates transmission resources for the UE and determines the parameters of processing a soft buffer.

In step 301, the base station allocates transmission resources for the UE, determines parameters of processing a soft buffer, and then performs rate matching for the physical downlink sharing channel PDSCH.

In an embodiment of the present invention, a processing method includes, when the uplink-downlink subframe distribution of a cell changes, determining the current actual maximum number of downlink HARQ processes, and according to this actual maximum number of downlink HARQ processes, processing a soft buffer. For example, the current actual maximum number of downlink HARQ processes of a cell is denoted $M_{DL\_HARQ}^{real}$, and based on the base station rate matching method defined in the current LTE TDD Release 10, the actual maximum number of downlink HARQ processes $M_{DL\_HARQ}^{real}$ is used to calculate the soft buffer allocated to each code block. The size of the soft buffer of the UE is denoted $N_{soft}$, then when the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from the transport block, $K_w$ is the total number of encoding bits output by turbo encoding, $$N_{IR} = \left\lfloor \frac{N_{soft}}{K_C \cdot K_{MIMO} \cdot \min(M_{DL\_HARQ}^{real}, M_{limit})} \right\rfloor,$$

where $K_{MIMO}$ depends on the transmission mode of the UE, for MIMO transmission mode, $K_{MIMO}=2$, for non-MIMO transmission mode, $K_{MIMO}=1$, $M_{limit}$ is a constant equal to 8, and $K_C$ is a constant related to the category of UE capacity. Thus, the hale station performs rate matching for the UE data based on the size of the soft buffer $$N_{cb} = \min\left(\left\lfloor \frac{N_{IR}}{C} \right\rfloor, K_w\right),$$

Corresponding to the operations at the base station, there are many methods of the UE processing a soft buffer, and a method of the UE processing a soft buffer based on $M_{DL\_HARQ}^{real}$ is described hereafter. At the UE side, based on the method of the UE processing a soft buffer as defined in LTE TDD Release 10, the UE can equally allocate its soft buffer to multiple cells which are configured by the base station for the UE to work in, and for each cell, for at least $K_{MIMO} \cdot \min(M_{DL\_HARQ}^{real}, M_{limit})$ transport blocks, when the decoding of a code block of a transport block fails, the number of soft bits kept for this code block is at least $$n_{SB} = \min\left(N_{cb}, \left\lfloor \frac{N_{soft}}{C \cdot N_{cells}^{DL} \cdot K_{MIMO} \cdot \min(M_{DL\_HARQ}^{real}, M_{limit})} \right\rfloor\right),$$

where, $N_{cells}^{DL}$ is the number of cells that the base station configures for the UE to work in. Specifically, these soft bits are denoted $w_k, w_{k+1}, \ldots, w_{mod(k+n_{SB}-1,N_{cb})}$, where $w_k$ is a soft bit received by the UE, and k is the smallest index of the indexes of the respective soft bits received by the UE. The base station can be based on the above method of the UE keeping soft bits for the code block so as to optimize retransmission operation of the HARQ with incremental redundancy (HARQ IR).

Based on the above HARQ-ACK timing relation of downlink transmission of the cell by adopting a reference HARQ-ACK timing relation, the maximum number of downlink HARQ processes determined according to the reference HARQ-ACK timing relation is denoted $M_{DL\_HARQ}^{ref}$. According to an embodiment of the present invention, another processing method processes a soft buffer by using the maximum number of downlink HARQ processes $M_{DL\_HARQ}^{ref}$ determined according to the reference HARQ-ACK timing relation, independent of the basic TDD uplink-downlink configuration configured in SIB1 broadcast information or actual distribution for current uplink-downlink subframe of the cell. In this case, if the method of defining the reference HARQ-ACK timing relation is reusing a HARQ-ACK timing relation of a traditional uplink-downlink configuration, e.g., any of the 7 downlink configurations as shown in Table 1, then accordingly, $M_{DL\_HARQ}^{ref}$ can be got from Table 3. For example, based on the method of base station rate matching defined in the LTE TDD release 10, $M_{DL\_HARQ}^{ref}$ is used to calculate the soft buffer allocated to each code block. When the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from the transport block, $K_w$ is the total number of encoding bits output by turbo encoding, $$N_{IR} = \left\lfloor \frac{N_{soft}}{K_C \cdot K_{MIMO} \cdot \min(M_{DL\_HARQ}^{ref}, M_{limit})} \right\rfloor,$$

where $K_{MIMO}$ depends on the transmission mode of the UE, and for MIMO transmission mode, $K_{MIMO}=2$, for non-MIMO transmission mode, $K_{MIMO}=1$, $M_{limit}$ is a constant equal to 8, and $K_C$ is a constant related to the category of UE capacity. Thus, the base station performs rate matching for the UE data according to the size of soft buffer $$N_{cb} = \min\left(\left\lfloor \frac{N_{IR}}{C} \right\rfloor, K_w\right).$$

Corresponding to the operations at the base station, there are many methods of processing a soft buffer for the UE, and a method of the UE processing a soft buffer based on $M_{DL\_HARQ}^{ref}$, is described hereafter. At the UE side, based on the method of UE processing a soft buffer defined in the current LTE TDD release 10, the UE can equally allocate its soft buffer to multiple cells which are configured by the base station for the UE to work in, and for each cell, and for at least $K_{MIMO} \cdot \min(M_{DL\_HARQ}^{ref}, M_{limit})$ transport blocks, when the decoding of a code block of a transport block fails, the number of soft bits kept for this code block is at least $$n_{SB} = \min\left(N_{cb}, \left\lfloor \frac{N_{soft}}{C \cdot N_{cells}^{DL} \cdot K_{MIMO} \cdot \min(M_{DL\_HARQ}^{ref}, M_{limit})} \right\rfloor\right),$$

where $N_{cells}^{DL}$ is the number of cells that the base station configures for the UE to work in. Specifically, these soft bits are denoted $w_k, w_{k+1}, \ldots, w_{mod(k+nSB-1, Ncb)}$, where $w_k$ is a soft bit received by the UE, and k is the smallest index of the indexes of the respective soft bits received by the UE. The base station can be based on the above method of the UE keeping soft bits for the code block so as to optimize the retransmission operation of HARQ with incremental redundancy (HARQ IR).

It should be understood that, when the base station processes a soft buffer based on any of the parameters $M_{DL\_HARQ}^{real}$, $M_{DL\_HARQ}^{base}$, X and $M_{DL\_HARQ}^{ref}$, the UE side can also process a soft buffer based on any of the parameters $M_{DL\_HARQ}^{real}$, $M_{DL\_HARQ}^{base}$, X and $M_{DL\_HARQ}^{ref}$. It shall be understood that the above combination can be joined and selected freely as required. If the base station and the UE adopt the same parameter for processing a soft buffer, then the operation consistency can be kept; and if the base station and the UE adopt different parameters for processing a soft buffer, then the optimization can be performed under different conditions.

In step 302, the base station sends data to the UE via PDCCH and PDSCH.

Afterwards, the UE receives the PDSCH sent by the base station, determines the parameter for processing a soft buffer; and when the PDSCH decoding verification fails, performs caching for soft bits of the PDSCH.

Figure 4:
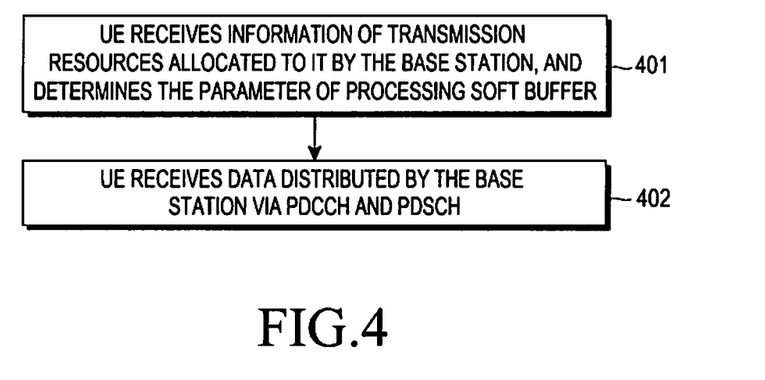
FIG. 4 is a flowchart of a method of terminal side processing of a soft buffer according to an embodiment of the present invention.

Corresponding to the method employed by the base station side, the present invention further includes a method of the UE processing a soft buffer. FIG. 4 is a flow chart showing a method of processing a soft buffer of the present invention, including the following steps.

In step 401, the UE receives information of transmission resources allocated to it by the base station, and determines the parameter for processing a soft buffer.

In an embodiment of the present invention, a processing method includes, when the uplink-downlink subframe distribution of the cell changes, determining the current actual maximum number of downlink HARQ processes, and processing a soft buffer according to this actual maximum number of downlink HARQ processes. The actual maximum number of HARQ processes of a cell is denoted $M_{DL\_HARQ}^{real}$.

There are many methods of processing a soft buffer for the base station, and a method of the base station processing a soft buffer based on $M_{DL\_HARQ}^{real}$ is described hereafter. Based on the method of rate matching of the base station defined in the current LTE TDD release 10, a soft buffer allocated to each code block is calculated by using this actual maximum HARQ process number $M_{DL\_HARQ}^{real}$. The size of the soft buffer of the UE is denoted $N_{soft}$, then when the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from a transport block, $K_w$, is the total number of encoding bits output by turbo encoding, $$N_{IR} = \left\lfloor \frac{N_{soft}}{K_C \cdot K_{MIMO} \cdot \min(M_{DL\_HARQ}^{real}, M_{limit})} \right\rfloor,$$

where $K_{MIMO}$ depends on the transmission mode of the UE, for MIMO transmission mode, $K_{MIMO}=2$, for non-MIMO transmission mode, $K_{MIMO}=1$, $M_{limit}$ is a constant equal to 8, and $K_C$ is a constant related to the category of the UE capacity.

At the UE side, based on the method of the UE processing a soft buffer defined in the current LTE TDD release 10, the UE can equally allocate its soft buffer to multiple cells which are configured by the base station for the UE to work in, and for at least $K_{MIMO} \cdot \min(M_{DL\_HARQ}^{real}, M_{limit})$ transport blocks, when the decoding of a code block of a transport block fails, the number of soft bits kept for this code block is at least $$n_{SB} = \min\left(N_{cb}, \left\lfloor \frac{N_{soft}}{C \cdot N_{cells}^{DL} \cdot K_{MIMO} \cdot \min(M_{DL\_HARQ}^{real}, M_{limit})} \right\rfloor\right),$$

where $N_{cells}^{DL}$ is the number of cells that the base station configures for the UE to work in. Specifically, these soft bits are denoted $w_k, w_{k+1}, \ldots, w_{mod(k+nSB-1, Ncb)}$, where $w_k$ is a soft bit received by the UE, and k is the smallest index of the indexes of the respective soft bits received by the UE. Thus, the UE can keep soft bits in the soft buffer for each code block according to the above method so as to support the retransmission operation of HARQ with incremental redundancy (HARQ IR).

The above method processes a soft buffer based on the actual maximum number of downlink HARQ transmission processes $M_{DL\_HARQ}^{real}$, its performance is optimal but the complexity thereof is relatively high. For example, in certain circumstances, according to specified or agreed upon specifications, the UE obtains the actual maximum number of downlink HARQ transmission processes $M_{DL\_HARQ}^{real}$. In addition, to lower complexity, the present invention discloses the following method to support more application scenarios.

In the LTE TDD system, a basic TDD uplink-downlink configuration is indicated in the broadcast information block SIB1, all UEs in the cell can receive this broadcast information, but old UEs can only determine the HARQ-ACK timing and the maximum number of downlink HARQ processes $M_{DL\_HARQ}^{real}$ according to this basic TDD uplink-downlink configuration, and process a soft buffer accordingly. The new UE not only can receive broadcasting information of this basic TDD uplink-downlink configuration, but also can receive other control information related to the uplink-downlink subframe distribution. In an embodiment of the present invention, a method is disclosed for a new UE to process a soft buffer based on the maximum number of downlink HARQ processes $M_{DL\_HARQ}^{base}$ defined in the LTE Release 8 for the basic TDD uplink-downlink configuration of the SIB1 broadcast information.

There are many methods of processing a soft buffer for the base station, and a method of the base station processing a soft buffer based on is described hereafter. Based on the rate matching method of a base station defined in the current LTE TDD release 10, a soft buffer allocated to each code block is calculated using this actual maximum HARQ process number $M_{DL\_HARQ}^{base}$. The size of the soft buffer of the UE is denoted $N_{soft}$, then when the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from a transport block, $K_w$ is the total number of encoding bits output by turbo encoding, $$N_{IR} = \left\lfloor \frac{N_{soft}}{K_C \cdot K_{MIMO} \cdot \min(M_{DL\_HARQ}^{base}, M_{limit})} \right\rfloor,$$

where $K_{MIMO}$ depends on the transmission mode of the UE, for MIMO transmission mode, $K_{MIMO}=2$, for non-MIMO transmission mode, $K_{MIMO}=1$, $M_{limit}$ is a constant equal to 8, and $K_C$ is a constant related to the category of UE capacity.

At the UE side, based on the method of the UE processing a soft buffer defined in the current LTE TDD release 10, the UE can equally allocate its soft buffer to multiple cells which are configured by the base station for the UE to work in, and for at least $K_{MIMO} \cdot \min(M_{DL\_HARQ}^{base}, M_{limit})$ transport blocks, when the decoding of a code block of a transport block fails, the number of soft bits kept for this code block is at least $$n_{SB} = \min\left(N_{cb}, \left\lfloor \frac{N_{soft}}{C \cdot N_{cells}^{DL} \cdot K_{MIMO} \cdot \min(M_{DL\_HARQ}^{base}, M_{limit})} \right\rfloor\right),$$

where $N_{cells}^{DL}$ is the number of cells that the base station configures for the UE to work in. Specifically, these soft bits are denoted $w_k, w_{k+1}, \ldots, w_{mod(k+nSB-1, Ncb)}$, where $w_k$ is a soft bit received by the UE, and k is the smallest index of the indexes of the respective soft bits received by the UE. The base station can be based on the above method of UE keeping soft bits for the code block so as to support the retransmission operation of HARQ with incremental redundancy (HARQ IR).

In an embodiment of the present invention, a method is disclosed for processing a soft buffer based on substituting a predefined value X into the maximum number of downlink HARQ processes independent of the basic TDD uplink-downlink configuration configured in SIB1 broadcast information or actual distribution for current uplink-downlink subframe of the cell. This predefined value can be configured by a high layer semi-statically, and can also be a fixed value in the standards. For example, the predefined value X is equal to 8. For Frequency Division Duplex (FDD), the maximum number of downlink HARQ processes is fixed to be 8, and the soft buffer is processed based on X being equal to 8, so that the downlink performance matches the FDD system.

There are many methods of processing a soft buffer for the base station, and a method of the base station processing a soft buffer based on X is described hereafter. Based on the method of base station rate matching defined in the current LTE TDD release 10, the soft buffer allocated to each code block is calculated using the predefined X. When the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from a transport block, $K_w$ is the total number of encoding bits output by turbo encoding, $$N_{IR} = \left\lfloor \frac{N_{soft}}{K_C \cdot K_{MIMO} \cdot \min(X, M_{limit})} \right\rfloor,$$

where $K_{MIMO}$ depends on the transmission mode of the UE, for MIMO transmission mode, $K_{MIMO}=2$, for non-MIMO transmission mode, $K_{MIMO}=1$, $M_{limit}$ is a constant equal to 8, and $K_C$ is a constant related to the category of the UE capacity.

At the UE side, based on the method of the UE processing a soft buffer defined in the current LTE TDD release 10, the UE can equally allocate its soft buffer to multiple cells which are configured by the base station for the UE to work in, and for at least transport blocks, when the decoding of a code block of a transport block fails, the number of soft bits kept for this code block is at least $$n_{SB} = \min\left(N_{cb}, \left\lfloor \frac{N_{soft}}{C \cdot N_{cells}^{DL} \cdot K_{MIMO} \cdot \min(X, M_{limit})} \right\rfloor\right),$$

where $N_{cells}^{DL}$ is the number of cells that the base station configures for the UE to work in. Specifically, these soft bits are denoted $w_k\ w_{k+1}, \ldots, w_{mod(k+nSB-1,\ Ncb)}$, where $w_k$ is a soft bit received by the UE, and k is the smallest index of the indexes of the respective soft bits received by the UE. Thus, the UE can keep soft bits in the soft buffer for each code block according to the above method so as to support the HARQ with incremental redundancy (HARQ IR).

Based on the above method of defining a HARQ-ACK timing relation of downlink transmission of the cell by adopting a reference HARQ-ACK timing relation, the maximum number of downlink HARQ processes determined according to the reference HARQ-ACK timing relation is denoted $M_{DL\_HARQ}^{ref}$. According to an embodiment of the present invention, a soft buffer is processed by using the maximum number of downlink HARQ processes $M_{DL\_HARQ}^{ref}$ determined according to the reference HARQ-ACK timing relation independent of the basic TDD uplink-downlink configuration configured in SIB1 broadcast information or current actual uplink-downlink subframe distribution of the cell. In this case, if the method of defining the reference HARQ-ACK timing relation is reusing a HARQ-ACK timing relation of a traditional uplink-downlink configuration, e.g., any of the 7 downlink configurations as shown in Table 1, then accordingly, $M_{DL\_HARQ}^{ref}$ can be got from Table 3. For example, based on the method of base station rate matching defined in the LTE TDD release 10, $M_{DL\_HARQ}^{ref}$ is used to calculate the soft buffer allocated to each code block.

There are many methods of processing a soft buffer for the base station, and a method of the base station processing a soft buffer based on $M_{DL\_HARQ}^{ref}$ is described hereafter. When the base station performs rate matching for each code block of a transport block, the size of the soft buffer of the code block is $$N_{cb} = \min\left(\left\lfloor \frac{N_{IR}}{C} \right\rfloor, K_w\right),$$

where C is the total number of code blocks divided from a transport block, $K_w$ is the total number of encoding bits output by turbo encoding, $$N_{IR} = \left\lfloor \frac{N_{soft}}{K_C \cdot K_{MIMO} \cdot \min(M_{DL\_HARQ}^{ref}, M_{limit})} \right\rfloor,$$

where $K_{MIMO}$ depends on the transmission mode of the UE, for MIMO transmission mode, $K_{MIMO}=2$, for non-MIMO transmission mode, $K_{MIMO}=1$, $M_{limit}$ is a constant equal to 8, and $K_C$ is a constant related to the category of the UE capacity.

At the UE side, based on the method of UE processing a soft buffer defined in the current LTE TDD release 10, the UE can equally allocate its soft buffer to multiple cells which are configured by the base station for the UE to work in, and for at least $K_{MIMO} \cdot \min(M_{DL\_HARQ}^{ref} \cdot M_{limit})$ transport blocks, when the decoding of a code block of a transport block fails, the least number of soft bits kept for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{ref}, M_{limit})} \right\rfloor\right),$$

where $N_{cells}^{DL}$ is the number of cells that the base station configures for the UE to work in. Specifically, these soft bits are denoted $w_k\ w_{k+1}, \ldots, w_{mod(k+n_{SB}-1,N_{cb})}$, where $w_k$ is a soft bit received by the UE, and k is the smallest index of the indexes of the respective soft bits received by the UE. Thus, the UE can keep soft bits in the soft buffer for each code block according to the above method so as to support the retransmission operation of HARQ with incremental redundancy (HARQ IR).

It should be understood that when the base station processes a soft buffer based on any of the parameters $M_{DL\_HARQ}^{real}$, $M_{DL\_HARQ}^{base}$, X and $M_{DL\_HARQ}^{ref}$, the UE side can also process a soft buffer based on any of the parameters $M_{DL\_HARQ}^{real}$, $M_{DL\_HARQ}^{base}$, X and $M_{DL\_HARQ}^{ref}$. It shall be understood that the above combination can be joined and selected freely as required. If the base station and the UE adopt the same parameter for processing a soft buffer, then the operation consistency can be kept; and if the base station and the UE adopt different parameters for processing a soft buffer, then the optimization can be performed under different conditions.

In step 402, the UE receives data distributed by the base station via PDCCH and PDSCH.

The UE receives the PDSCH sent by the base station, performs operations of rate de-matching, decoding, Cyclic Redundancy Checking (CRC), etc., and when the PDSCH decoding verification fails, performs caching for the soft bits of the PDSCH.

Further, an embodiment of the present invention is a method of supporting downlink transmission which includes the following steps: the UE receiving information sent by the base station via PDCCH and PDSCH according to the transmission resources allocated by the base station; and, afterwards, the UE feeding back HARQ-ACK information to the base station according to the reference HARQ-ACK timing relation, wherein the reference HARQ-ACK timing relation defines the HARQ-ACK feedback timing of the subframes applicable to downlink transmission during actual running.

Specifically, the HARQ-ACK timing relation reuses a HARQ timing relation of uplink-downlink configurations in existing specifications.

Figure 5:
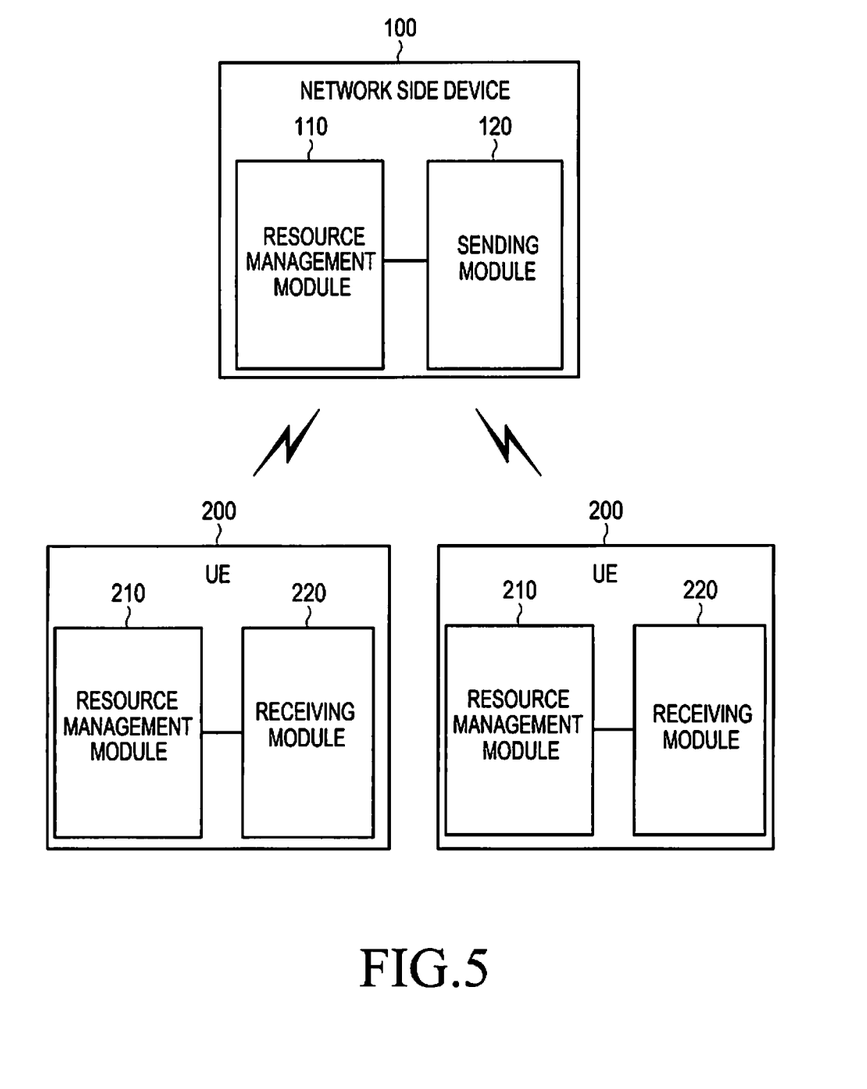
FIG. 5 is a schematic diagram of the base station side device and UE structures according to an embodiment of the present invention.

Based on the above method, as shown in FIG. 5, the present invention further discloses a device that includes a base station side device 100, a resource management module 110, and a sending module 120.

Specifically, the resource management module 110 is configured to allocate transmission resources for the UE and process a soft buffer according to a soft buffer parameter. The sending module 120 is configured to perform rate matching for a Physical Downlink Shared Channel (PDSCH) and send data to the UE via a Physical Downlink Control Channel (PDCCH) and PDSCH.

Specifically, the resource management module 110 processes a soft buffer according to a soft buffer parameter, in which the selection of the soft buffer parameter includes any one of or multiple of the following methods.

The parameter for processing a soft buffer is an actual maximum number of current downlink HARQ processes determined according to the uplink-downlink subframe distribution of a cell and the soft buffer is performed according to the actual maximum number of current downlink HARQ processes determined according to the uplink-downlink subframe distribution of the cell; the parameter for processing a soft buffer is a maximum number of downlink HARQ processes in the LTE release 8 defined by the basic TDD uplink-downlink configuration configured by SIB1 broadcast information, and the soft buffer is processed according to the maximum number of downlink HARQ processes in the LTE Release 8 defined by the basic TDD uplink-downlink configuration configured by the SIB1 broadcast information; the parameter for processing a soft buffer is a predefined fixed value of the maximum number of downlink HARQ processes, and the soft buffer is performed according to the predefined fixed value of the maximum number of downlink HARQ processes; and the parameter for processing soft buffer is a maximum number of downlink HARQ processes determined according to a reference HARQ-ACK timing relation, and the soft buffer is performed according to the maximum number of downlink HARQ processes determined according to the reference HARQ-ACK timing relation.

According to the above method, as shown in FIG. 5, an embodiment of the present invention discloses a user equipment (UE) 200 which comprises a resource management module 210 and a receiving module 220.

The resource management module 210 is configured to determine information of transmission resources allocated to it by a base station and determine a parameter for processing a soft buffer; and the receiving module 220 is configured to receive Physical Downlink Control Channel (PDCCH) and Physical Downlink Shared Channel (PDSCH) sent by a base station according to the transmission resources and the parameter for processing a soft buffer.

Specifically, the resource management module 210 processes a soft buffer according to the soft buffer parameter, wherein the selection of the soft buffer parameter comprises any one of or multiple of the following ways: the parameter for processing soft buffer is a current actual maximum number of downlink HARQ processes determined according to the uplink-downlink subframe distribution of a cell and the soft buffer is performed according to the current actual maximum number of downlink HARQ processes determined according to the uplink-downlink subframe distribution of the cell; the parameter for processing a soft buffer is a maximum number of downlink HARQ processes in the LTE release 8 defined by the basic TDD uplink-downlink configuration configured by SIB1 broadcast information, and the soft buffer is processed according to the maximum number of downlink HARQ processes in the LTE Release 8 defined by the basic TDD uplink-downlink configuration configured by the SIB1 broadcast information; the parameter for processing a soft buffer is a predefined fixed value of the maximum number of downlink HARQ processes, and the soft buffer is performed according to the predefined fixed value of the maximum number of downlink HARQ processes; and the parameter for processing a soft buffer is a maximum number of downlink HARQ processes determined according to a reference HARQ-ACK timing relation, and the soft buffer is performed according to the maximum number of downlink HARQ processes determined according to the reference HARQ-ACK timing relation.

The present invention, when changing the uplink-downlink subframe allocation, provide methods of processing a soft buffer of data during HARQ downlink transmission. The present invention avoids confusion of HARQ redundancy versions of data transmission between a base station and a UE, and optimizes the performance of HARQ soft combination. The present invention does not affect a system's compliance, which is fulfilled efficiently and simply.

Modifications and changes can be made by those skilled in the art without departing from the scope of the present invention, and these modifications and changes should be construed as falling within the scope of the present invention.

The invention claimed is:

1. A method of processing data performed by a user equipment (UE), the method comprising:
   receiving, through system information block 1 (SIB1), a first uplink/downlink (UL/DL) configuration;
   obtaining a first maximum number of downlink hybrid automatic repeat request (HARQ) processes for the first UL/DL configuration;
   obtaining a first soft buffer size for a first code block based on a number of first code blocks divided from a first transport block and a first parameter NIR associated with the first maximum number of the downlink HARQ processes information;
   performing a HARQ soft combination based on the first soft buffer size;
   receiving, through radio resource control (RRC) signaling, a HARQ timing relation information;
   identifying a change from the first UL/DL configuration to a second UL/DL configuration;
   after the change from the first UL/DL configuration to the second UL/DL configuration, obtaining a second maximum number of downlink HARQ processes for the second UL/DL configuration based on the reference HARQ timing relation;
   obtaining a second soft buffer size for a second code block based on a second number of code blocks divided from a second transport block and a second parameter NIR associated with the second maximum number of the downlink HARQ processes information; and
   performing the HARQ soft combination based on the second soft buffer size.

2. A user equipment (UE), the UE comprising:
   a transceiver configured to transmit and receive data; and
   a controller configured to control:
   to receive, through system information block 1 (SIB1), a first uplink/downlink (UL/DL) configuration;

to obtain a first maximum number of downlink hybrid automatic repeat request (HARQ) processes for the first UL/DL configuration;

to obtain a first soft buffer size for a first code block based on a number of first code blocks divided from a first transport block and a first parameter NIR associated with the first maximum number of the downlink HARQ processes information;

to perform a HARQ soft combination based on the first soft buffer size;

to receive, through radio resource control (RRC) signaling a HARQ timing relation information;

to identify a change from the first UL/DL configuration to a second UL/DL configuration, to obtain, after the change from the first UL/DL configuration to the second UL/DL configuration, a second maximum number of downlink HARQ processes for the second UL/DL configuration based on the reference HARQ timing relation information, to obtain a second soft buffer size for a second code block based on a second number of code blocks divided from a second transport block and a second parameter NIR associated with the maximum number of the downlink HARQ processes, and to perform the HARQ soft combination based on the second soft buffer size.

* * * * *